Nov. 26, 1929.                L. B. ELLIS                1,737,302
                       NOTCHED FACE PISTON RING
                        Filed March 31, 1927
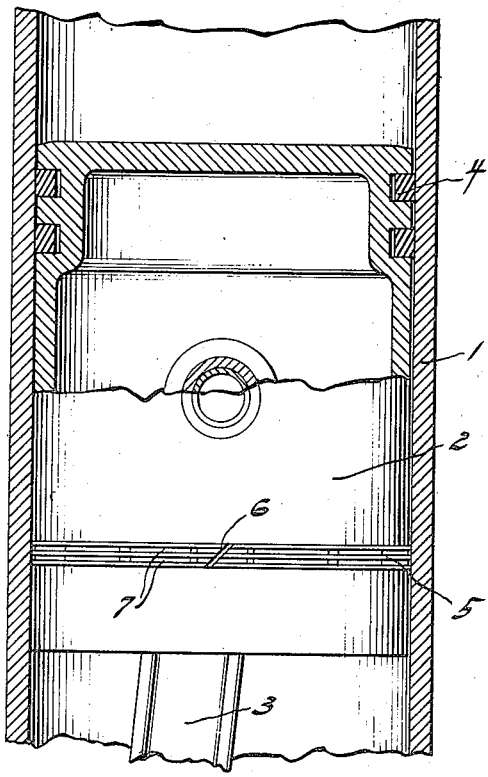
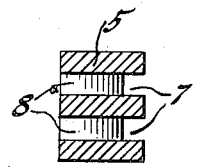
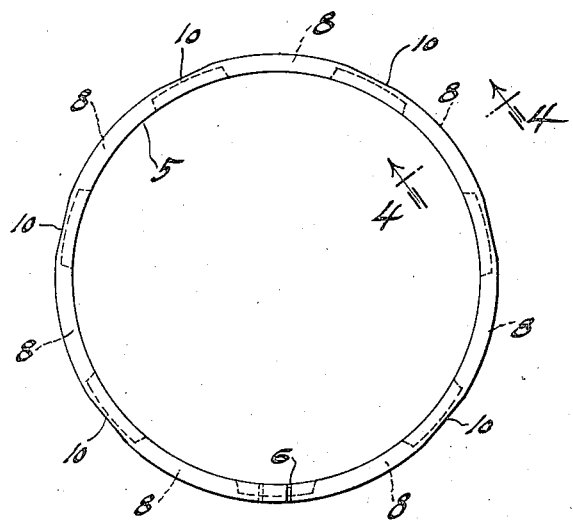
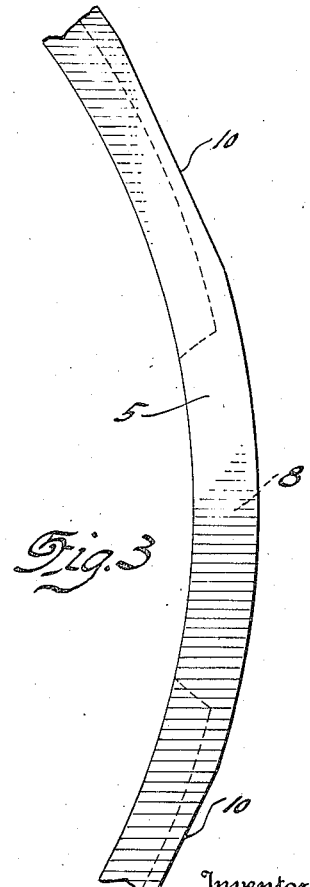
Inventor
Lockwood B. Ellis
By Blackmore, Spencer & Hill
Attorneys Patented Nov. 26, 1929

1,737,302

UNITED STATES PATENT OFFICE

LOCKWOOD B. ELLIS, OF DETROIT, MICHIGAN, ASSIGNOR TO GENERAL MOTORS CORPORATION, OF DETROIT, MICHIGAN, A CORPORATION OF DELAWARE

NOTCHED-FACE PISTON RING

Application filed March 31, 1927. Serial No. 179,913.

This invention relates to internal combustion engines for motor vehicles and more particularly to an oil control piston ring which will insure proper lubrication between the cylinder walls and the reciprocating pistons.

Oil rings are usually provided near the bottom of the piston skirt to seal the passage of crankcase lubricating oil and prevent pumping of oil upward past the piston into the combustion chamber. The thin film of oil which adheres to the cylinder wall during piston travel serves to lubricate the surfaces between the cylinder wall and pistons. Some difficulty has been experienced at certain engine speeds in that gases from the combustion chamber are blown past the compression piston rings, carrying along the oil film, and the cylinder wall is left more or less dry. The failure of sufficient lubricant causes frictional wear and results in a sharp engine knock.

The present invention contemplates the provision of an oil control ring which will have the usual tight running fit in the cylinder to obviate oil pumping, but which will also be provided with small cut away or flat portions of predetermined size on the peripheral face of the ring to permit oil to pass the ring in sufficient quantity to maintain an oil film of proper thickness. Such increased oil film assists the compression rings in sealing against gas leakage, with the consequent result of better and increased compression, and lubricates the cylinder wall to the extent that it will not be blown dry by gas leakage around the compression rings, whereby engine knock is practically eliminated, frictional wear reduced and oil consumption lowered.

In the accompanying drawing, wherein is shown a preferred embodiment of the invention, Figure 1 is a vertical sectional view of an engine cylinder and a reciprocatory piston therein, illustrating the application of the oil control ring, forming the subject matter hereof; Figure 2 is a top plan view of the ring; Figure 3 is a detail enlarged view of a portion of the ring; and Figure 4 is a section on line 4—4 of Figure 2.

Referring to the drawing, the numeral 1 indicates an engine cylinder, 2 a piston and 3 a connecting rod to impart crankshaft revolutions to reciprocate the piston 2 within the cylinder 1. Located within annular grooves in the head of the piston are the customary compression sealing rings 4—4, and carried within an annular groove near the bottom of the piston skirt is the oil control ring 5.

The oil ring illustrated consists of a ring having a diagonal slit or bevel cut 6 in order that it may be fitted into the ring groove and so that it can expand, and exert tension equally at all points of its circumference against the cylinder wall. It is further provided with a pair of annular grooves 7—7 to collect excess oil as the ring wipes the cylinder wall and a number of spaced openings or slots 8—8 (see Fig. 4) extend inwardly thru the ring, from the respective grooves 7—7 to permit excess oil collected in the grooves to flow inwardly, and drain back to the crankcase thru openings extending thru the piston wall, as is the common practice.

The peripheral face of the ring is indented or cut away as at 10—10, to afford axial notches, which in co-operation with the cylinder wall form passageways to permit crankcase oil to pass from one side of the ring to the other, while the face portions contact with the cylinder wall in the usual manner forming a seal against excess oil. These notches or clearance spaces may be of any convenient number or shape, the preferred arrangement being to simply provide a flat portion across the peripheral face, at each land intermediate the spaced slots except at the diagonally cut land constituting adjacent ends of the ring, where the slit itself may be relied on to pass oil. The depth and extent of each flat indentation or notch will be governed by the number to be employed, and the total clearance space to be afforded by the several notches, which space may be varied according to conditions of use and the predetermined amount of lubricant necessary to maintain the proper oil film on the cylinder walls in different types of engines.

From the above description it will be apparent that there is provided an oil ring that will definitely control the amount of oil permitted to pass beyond the ring, and insure a constant film to properly lubricate contacting surfaces of the piston and cylinder wall, overcoming the many disadvantages of insufficient lubrication, resultant engine noises and knocks and loss of compression.

While the invention has been described more or less specifically, it is obvious that the particular form of the ring is capable of various modifications, as come within the scope of the appended claims.

I claim:

1. Means to lubricate the contacting surfaces between a cylinder and a reciprocatory piston therein, including an oil sealing ring carried by the lower end of the piston in sliding engagement with the cylinder wall, having a series of circumferentially spaced indentations extending entirely across the peripheral face thereof and forming passageways for passage of oil from the crank case beyond said ring.

2. In an internal combustion engine, the combination of a cylinder, a reciprocatory piston therein, having a plurality of ring grooves, an oil control ring carried by the lowermost ring groove, the peripheral face of which is adapted to slidingly engage the cylinder wall to seal the passage of oil therebeyond, said peripheral face having notches of predetermined size extending thereacross in spaced circumferential relation to permit a limited amount of oil to pass said ring.

3. Means to lubricate the contacting surfaces between a cylinder and a reciprocating piston therein including a circumferentially grooved oil control ring carried by the piston having spaced slots extending radially thru the ring and flat peripheral surfaces intermediate the slotted portions forming with the walls of the cylinder, a clearance space for the axial passage of crankcase oil therebeyond.

4. An annular split piston ring, having a circumferential groove and a plurality of spaced radial slots extending thru the ring in alignment with said groove, the peripheral surface of the ring being provided with indentations extending axially thereacross at points intermediate said slots.

5. An oil control ring of the character described, whose peripheral surface consists of a series of arcuate and flat sections arranged in alternate relation throughout its circumference.

6. An oil control ring of the character described, having its peripheral surface divided into a succession of arcuate and flattened portions.

In testimony whereof I affix my signature.

LOCKWOOD B. ELLIS.